(12) United States Patent
Shreve

(10) Patent No.: US 10,813,731 B2
(45) Date of Patent: Oct. 27, 2020

(54) SYSTEM FOR AMPLITUDE ADJUSTMENT OF AN ORAL CARE APPLIANCE

(75) Inventor: Peter Lewis Shreve, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 13/820,425

(22) PCT Filed: Sep. 29, 2011

(86) PCT No.: PCT/IB2011/054284
§ 371 (c)(1),
(2), (4) Date: Mar. 1, 2013

(87) PCT Pub. No.: WO2012/042493
PCT Pub. Date: Apr. 5, 2012

(65) Prior Publication Data
US 2013/0177863 A1 Jul. 11, 2013

Related U.S. Application Data

(60) Provisional application No. 61/388,029, filed on Sep. 30, 2010.

(51) Int. Cl.
A61C 17/22 (2006.01)
A46B 15/00 (2006.01)
G06F 3/0354 (2013.01)
A46B 13/02 (2006.01)
A61C 17/34 (2006.01)

(52) U.S. Cl.
CPC ........ *A61C 17/221* (2013.01); *A46B 15/0002* (2013.01); *A46B 15/0004* (2013.01); *A46B 15/0008* (2013.01); *G06F 3/03547* (2013.01); *A46B 13/02* (2013.01); *A46B 2200/1066* (2013.01); *A61C 17/222* (2013.01); *A61C 17/349* (2013.01); *A61C 17/3436* (2013.01)

(58) Field of Classification Search
CPC . A46B 13/02; A46B 15/0002; A46B 15/0004; A46B 15/0008; A46B 2200/1066; A61C 17/221; A61C 17/222; A61C 17/349; A61C 17/3436; G06F 3/3547
USPC .......................................... 15/22.1, 167.1, 4
See application file for complete search history.

(56) References Cited

U.S. PATENT DOCUMENTS 6,822,640 B2    11/2004  Derocher
6,879,930 B2 *   4/2005  Sinclair ............... G06F 3/03547
                                                                 702/150
(Continued)

FOREIGN PATENT DOCUMENTS

DE    19923104 A1    11/2000
EP    2189198 A1    5/2010
(Continued)

*Primary Examiner* — Mark Spisich
*Assistant Examiner* — Katina N. Henson

(57) ABSTRACT

The amplitude control assembly for an oral care appliance includes a capacitance-sensing touch array (26) responsive to the position of a user's touch thereon to change the value of capacitance from the array, as determined by a sensor (30). A control assembly (24), responsive to the change of capacitance, changes an operating characteristic of the drive signal for the appliance, to change the amplitude of motion of a workpiece portion of the oral care appliance.

11 Claims, 2 Drawing Sheets

(56) References Cited

U.S. PATENT DOCUMENTS

| | | | |
|---|---|---|---|
| 8,017,890 B2* | 9/2011 | Paradiso | H05B 3/746 219/443.1 |
| 2008/0109973 A1* | 5/2008 | Farrell | A46B 7/04 15/4 |
| 2008/0196185 A1 | 8/2008 | Gatzemeyer et al. | |
| 2009/0225060 A1 | 9/2009 | Rizoiu et al. | |
| 2009/0231271 A1* | 9/2009 | Heubel | G06F 3/016 345/156 |
| 2009/0241276 A1* | 10/2009 | Hall | A61C 17/221 15/22.1 |

FOREIGN PATENT DOCUMENTS

| | | |
|---|---|---|
| JP | 2000137564 A | 5/2000 |
| JP | 2005512708 A | 5/2005 |
| JP | 2006277588 A | 10/2006 |
| JP | 2010028364 A | 2/2010 |
| JP | 2010509023 A | 3/2010 |
| WO | 203054771 A1 | 7/2003 |
| WO | 2006003617 A1 | 1/2006 |
| WO | 2007032015 A2 | 3/2007 |
| WO | WO2008060482 A2 | 5/2008 |

* cited by examiner

SYSTEM FOR AMPLITUDE ADJUSTMENT OF AN ORAL CARE APPLIANCE

This application is a national stage application of PCT/IB2011/054284, filed Sep. 29, 2011 and claims priority of U.S. Provisional Application No. 61/388,029, filed Sep. 30, 2010.

This invention relates generally to oral care appliances, such as power toothbrushes, and more specifically concerns user control of the amplitude of the movement of a workpiece portion of the appliance.

In an oral care appliance, such as for instance a power toothbrush, different brushing amplitudes are preferred by various users. For example, gum sensitivity among users of the appliance can vary significantly. Sensitivity may also vary between regions of the mouth for a given individual. A selected amplitude that may be satisfactory and comfortable for some users may cause soft tissue damage and/or bleeding in certain users, or be inadequate for optimal efficacy in others. Further, some areas of the mouth may require more intense action, e.g. more intense brushing, than others to prevent the buildup of plaque.

Current oral care appliances such as power toothbrushes typically provide little if any capability for adjustment of amplitude of motion of the brushhead. In most cases where there is an adjustment capability, only two settings are available, typically, normal and gentle. Further, the amplitude typically cannot be changed during operation of the appliance.

Hence, it is desirable to have an amplitude control system which can provide the user the ability to adjust the amplitude of the workpiece motion over a selected range and/or also during actual operation of the appliance.

Accordingly, an oral care appliance is disclosed which includes a workpiece which moves in operation, and further includes an amplitude control system which comprises: a touch array with a range of a selected touch characteristic, the value of which varies depending upon the location of a user's touch on the array; a sensor for determining the position of a user's touch on the array and the corresponding value of the touch characteristic; and a controller assembly or processor responsive to the sensor for controlling the value of an operating characteristic of a drive signal for the oral care appliance, in order to change the amplitude of movement of the workpiece in accordance with the value of the touch characteristic.

Figure 1:
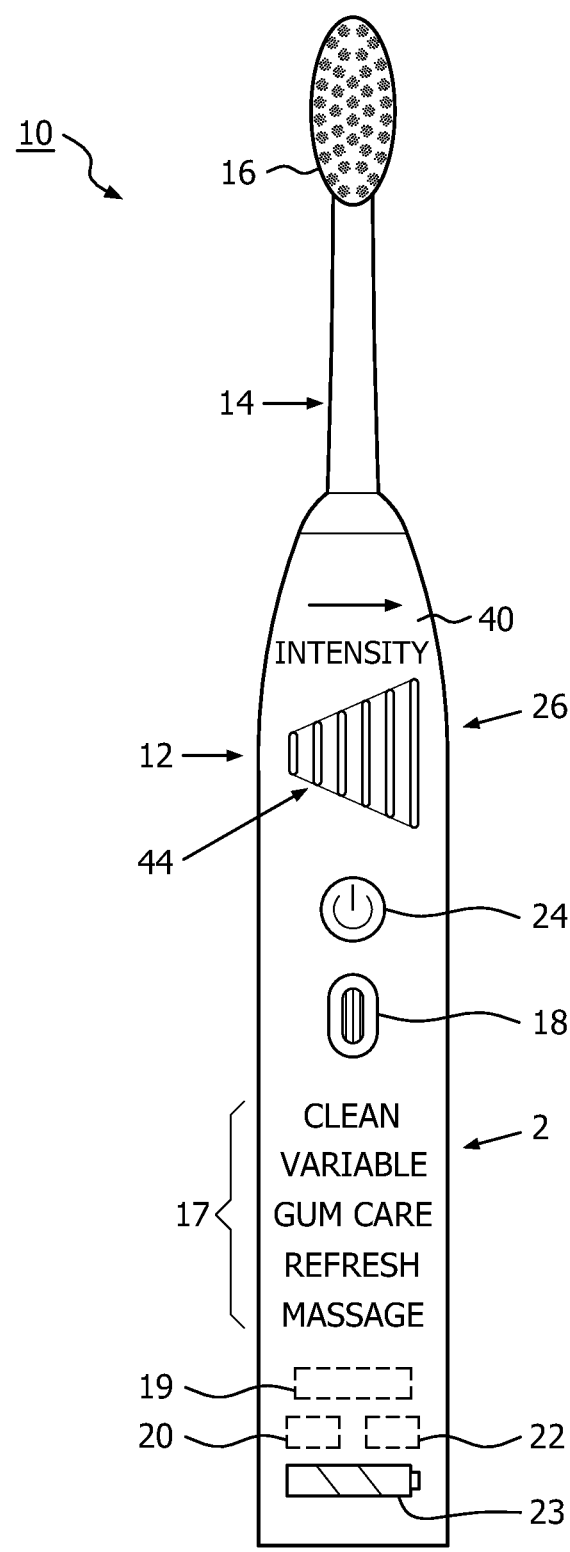
FIG. 1 is a front view of a power toothbrush having an amplitude control capability and display.

FIG. 1 shows a power toothbrush which incorporates a user controlled variable amplitude system. The variable amplitude system can be used with a variety of oral care appliances, including power toothbrushes. The power toothbrush of FIG. 1 is an example of a power toothbrush which is suitable for a variable amplitude system. The power toothbrush, shown generally at 10, includes in general a body portion 12, a neck portion 14 and a brushhead portion 16. The body portion 12 includes a drive assembly/circuit 19, a control unit 20, and a power source 22, as well as a battery charge level display 23, for producing a brushhead motion suitable for effective cleaning of teeth. The elements are shown representationally because they are conventional in the art of power toothbrushes. The toothbrush 10 shown includes a variety of brushing modes referenced at 17 which are controlled by a mode select switch 18. The operation of the toothbrush itself is controlled by an on/off switch 24. The particular toothbrush configuration and arrangement shown in FIG. 1 is by way of example only and does not limit the scope of the amplitude control system disclosed below.

The amplitude control assembly includes a touch-sensitive assembly/display 26, positioned on a front surface of the toothbrush body, with a range of a selected touch characteristic. In the embodiment shown, the touch characteristic is capacitance and the array is a conventional capacitance-sensing array, which generally comprises a rear plate and a front plate of multiple pieces, typically diamond-shaped, arranged to produce a changing value of capacitance at the output of the array as a user's finger moves across the array. The array 26 is configured to permit the user to slide a finger thereacross which results in a variation in capacitance at the output of the array, depending on the position of the user's finger on the array.

Figure 2:
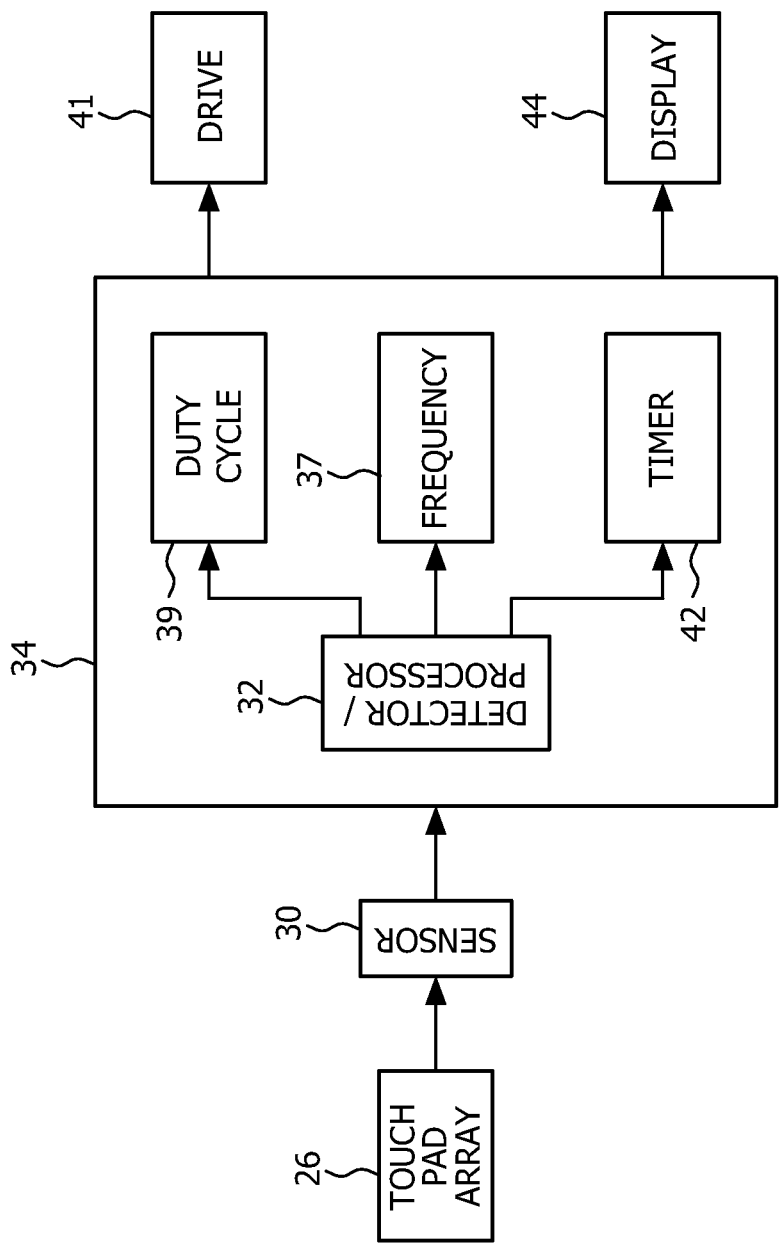
FIG. 2 is a block diagram of the amplitude control system.

Referring now to FIG. 2, a capacitance sensor 30 will detect the specific capacitance from the capacitance array 26 produced by the position of the user's finger on the array, and will convey position information to a detector/processor circuit 32, which is part of a microcontroller 34. Alternatively, the capacitance array 31 can be connected directly to the processor circuit 32 to provide positional information. In the embodiment shown, the change in the value of detected capacitance from the array will result in a change in the value of capacitance applied to an RC oscillator circuit in detector 32, the output of which changes frequency, due to the change of capacitance in the RC circuit. This frequency change which is due to a change in the position of the user's finger on the display is recognized by the processor 32, which then changes the frequency 37 of, or the duty cycle 39 of, the drive signal for the appliance. The changed drive signal, which controls the operation of the appliance, when applied to the drive assembly 41 for the appliance results in a change in amplitude of the brushhead or other workpiece.

Typically, the array 26 in FIG. 1 is arranged so that by the user moving a contact finger from left to right on the display of FIG. 1, an increase in amplitude results, while from right to left a decrease in amplitude occurs. The touch array, which allows the user to select any value of capacitance within the range of the array, results in a continuous range of possible amplitudes, as opposed to a few discrete values. An indicator or icon display 40 on the body of the toothbrush itself (FIG. 1) will provide instructions to the user as to how to increase or decrease the brushing amplitude. Referring to FIG. 2, the processor 32, in response to a change of capacitance from array 26, which results in a change of brushing amplitude, will also adjust the time of brushing, through timer 42, with an increase of amplitude producing a decrease in time of brushing and vice versa.

The controller 34 also sends a signal to a display portion 44 of the array 26, which indicates the amplitude, so that the user can visually see the selected amplitude, determined by the position of the user's finger on the array within the overall range of possible amplitudes. It should be understood that other touch arrays can be used instead of capacitance. A pressure array could be used, as an example of another touch characteristic.

The preferred amplitude for a power toothbrush is approximately 9°. The amplitude could for instance be adjusted with the present arrangement from a low of approximately 4° to 16-18° at maximum, although these limits could be varied.

Accordingly, an assembly has been disclosed which provides a capability for a user to adjust the amplitude of the movement of a workpiece for oral care, such as a brushhead in a power toothbrush. The adjustment is continuous over a selected range. The adjustment can be accomplished even during operation of the appliance so that different regions of the mouth can be serviced with different brushing amplitudes, without stopping the appliance. The actual amplitude selected within the range is also displayed.

Although a preferred embodiment of the invention has been disclosed for purposes of illustration, it should be understood that various changes, modifications and substitutions may be incorporated in the embodiment without departing from the spirit of the invention, which is defined by the claims which follow.

The invention claimed is:

1. An amplitude control system comprising: an oral care appliance having a workpiece which moves in operation;
   a touch screen array having a display portion, providing at an output thereof a changing value of a selected capacitance, the value thereof depending upon the location of a user's touch on the display, said touch array configured to allow the user to select any value of capacitance of the array and visualize the current capacitance setting of the array;
   a sensor for detecting the value of the capacitance at the output of the array; and
   a controller assembly or processor configured to be responsive to the sensor and control a value of an operating characteristic of a drive signal for the oral care appliance, and further configured to increase or decrease movement amplitude of the workpiece over an entire range of amplitudes of the workpiece within the range of approximately 4° to approximately 18° in accordance with the corresponding value of the capacitance, wherein the controller assembly or processor is further configured to, during operation of the workpiece by the user:
   process the user's continuous touch on the display along a distance from a first position to a second position in a first direction and produce a corresponding continuous and linear increase in the amplitude over all amplitude values from the first position to the second position; and
   process the user's continuous touch on the display along the distance from the second position to the first position in a second direction and produce a corresponding continuous and linear decrease in the amplitude over all amplitude values from the second position to the first position.

2. The system of claim 1, wherein the operating characteristic is frequency or duty cycle of the drive signal.

3. The system of claim 1, wherein the display portion shows the movement amplitude of the workpiece.

4. The system of claim 1, including an icon showing the user the direction of touch on the array to increase or decrease the movement amplitude of the workpiece.

5. The system of claim 1, wherein the oral care appliance is a power toothbrush and the workpiece is a brushhead.

6. The system of claim 1, wherein a time of operation of the appliance is adjusted in accordance with the movement amplitude of the workpiece.

7. An oral care appliance, comprising: a body portion which includes a drive system;
   a workpiece assembly which moves in operation in response to the drive system;
   a touch screen array having a display portion on the body portion providing at an output thereof a changing value of a selected capacitance, the value of which varies depending on a location of a user's touch on the display, said touch array configured to allow the user to select any value of capacitance of the array and visualize the current capacitance setting of the array;
   a sensor for detecting the value of the capacitance at the output of the array; and
   a control system configured to be responsive to the sensor and control an operating characteristic of a drive signal for the drive system and further configured to produce an increase or decrease of amplitude of the workpiece over an entire range of amplitudes of the workpiece within the range of approximately 4° to approximately 18° in accordance with the value of the corresponding capacitance, wherein the control system is further configured to, during operation of the workpiece by the user:
   process the user's continuous touch on the display along a distance from a first position to a second position in a first direction and produce a corresponding continuous and linear increase in the amplitude over all amplitude values from the first position to the second position; and
   process the user's continuous touch on the display along the distance from the second position to the first position in a second direction and produce a corresponding continuous and linear decrease in the amplitude over all amplitude values from the second position to the first position.

8. The oral care appliance of claim 7, wherein the oral care appliance is a power toothbrush and the workpiece is a brushhead.

9. The oral care appliance of claim 7, wherein the operating characteristic of the drive signal is frequency or duty cycle.

10. The oral care appliance of claim 7, wherein the operation of the appliance for a single operating event has a time duration which is adjusted in accordance with the amplitude of the workpiece.

11. An amplitude control system comprising: an oral care appliance having a workpiece which moves in operation;
    a touch screen array having a display portion, providing at an output thereof a changing value of a selected capacitance, the value thereof depending upon the location of a user's touch on the display, said touch array configured to allow the user to select any value of capacitance of the array;
    a sensor for detecting the value of the capacitance at the output of the array; and
    a controller assembly or processor configured to be responsive to the sensor and control a value of an operating characteristic of a drive signal for the oral care appliance, and further configured to increase or decrease movement amplitude of the workpiece over an entire range of amplitudes of the workpiece within the range of approximately 4° to approximately 18° in accordance with the corresponding value of the capacitance, wherein the controller assembly or processor is further configured to, during operation of the workpiece by the user:
    process the user's continuous touch on the display along a distance from a first position to a second position in a first direction and produce a corresponding continuous and linear increase in the amplitude over all amplitude values from the first position to the second position; and
    process the user's continuous touch on the display along the distance from the second position to the first position in a second direction and produce a corresponding continuous and linear decrease in the amplitude over all amplitude values from the second position to the first position,
wherein the touch array comprises a front plate, the front plate comprising a plurality of array pieces.

* * * * *